United States Patent [19]

Glassmeyer et al.

[11] 4,042,275

[45] Aug. 16, 1977

[54] STAKE POST AND CAP ARRANGEMENT FOR TRAILER

[75] Inventors: John J. Glassmeyer, Covington, Ky.; Howard W. Hughes, Cincinnati, Ohio

[73] Assignee: Pullman Incorporated, Chicago, Ill.

[21] Appl. No.: 570,156

[22] Filed: Apr. 21, 1975

[51] Int. Cl.² .............................................. B60P 7/06
[52] U.S. Cl. .................................. 296/43; 296/28 M; 296/36; 296/104
[58] Field of Search ................. 296/29, 36, 43, 40, 296/104, 28 M; 52/301, 585, 45, 46, 93; 292/300; 403/179, 287, 295, 335, 403

[56] References Cited

U.S. PATENT DOCUMENTS

| 358,766 | 3/1887 | Albro | 296/36 X |
|---|---|---|---|
| 866,344 | 9/1907 | Dyer | 296/43 X |
| 2,355,794 | 8/1944 | Gentry | 296/104 X |
| 2,882,088 | 4/1959 | Black | 296/12 |
| 3,019,042 | 1/1962 | Smith | 403/405 X |
| 3,022,106 | 2/1962 | Black | 296/40 X |
| 3,126,224 | 3/1964 | Carter | 296/43 X |
| 3,628,816 | 1/1971 | Ross | 403/405 X |
| 3,794,375 | 2/1974 | Woodward | 296/36 |
| 3,811,724 | 5/1974 | Woodward | 296/36 |
| 3,837,702 | 9/1974 | Case | 296/104 X |
| 3,871,702 | 3/1975 | Glassmeyer | 296/36 |
| 3,940,179 | 2/1976 | McBride | 296/104 X |

FOREIGN PATENT DOCUMENTS

| 448,769 | 4/1968 | Switzerland | 296/36 |

Primary Examiner—Robert J. Spar
Assistant Examiner—Winston H. Douglas
Attorney, Agent, or Firm—Richard J. Myers

[57] ABSTRACT

A cap for a hollow stake of a highway cargo vehicle having a tarpaulin roof supported above the cargo bed of the vehicle by a plurality of stakes. The cap encloses the top of the stake to protect its interior from the elements and includes a fastening means which extends downwardly and is couplable with the inner portions of the hollow stake. The cap is provided with a bow socket portion which cooperates with a stake bow socket portion provided in the interior of the post to form a bow receiving socket for receiving a bow extending through the protector cap into the hollow stake.

6 Claims, 4 Drawing Figures

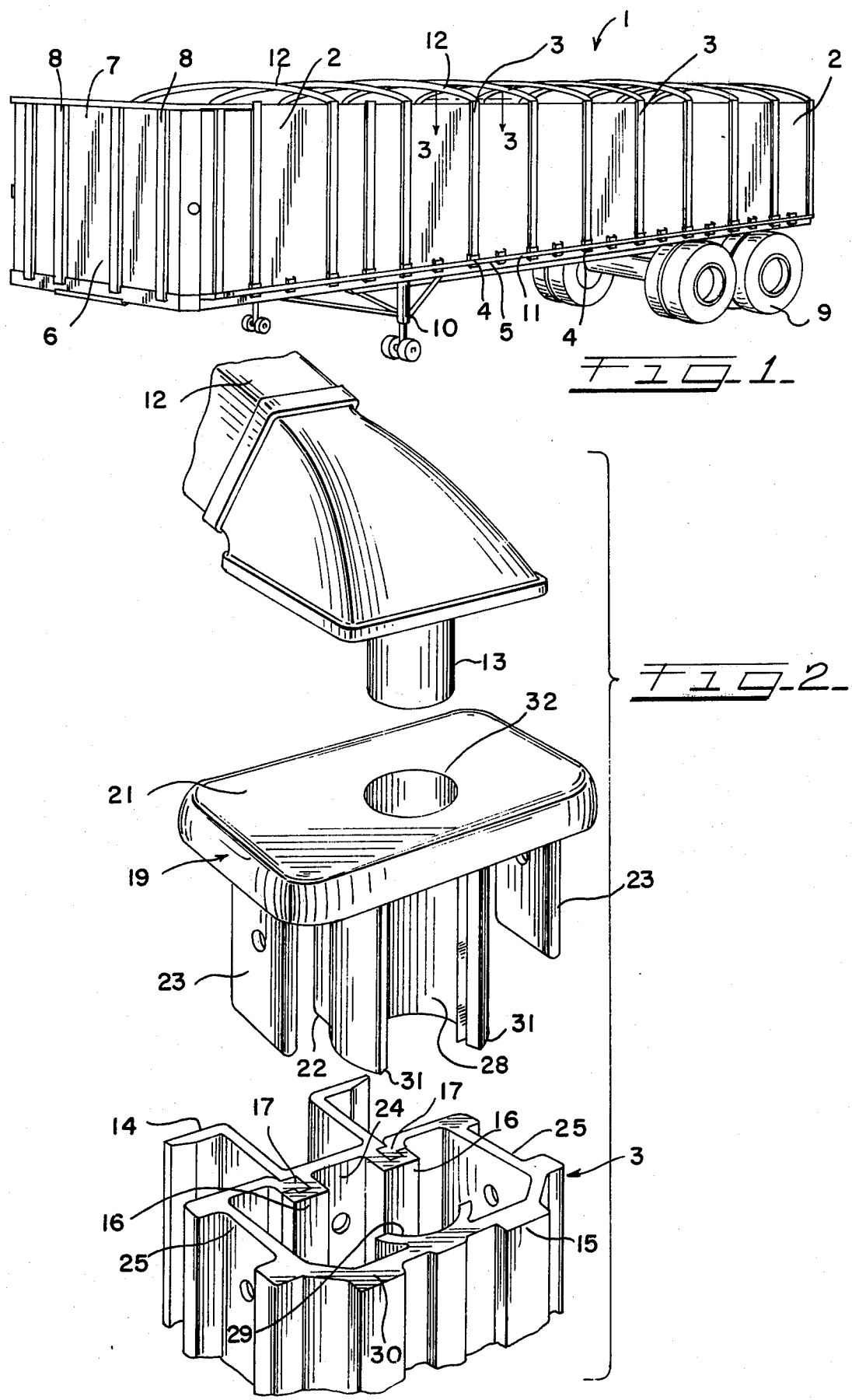

STAKE POST AND CAP ARRANGEMENT FOR TRAILER

BACKGROUND OF THE INVENTION

1. Field of the Invention

This invention relates to certain new and useful improvements in over-the-highway truck or trailer bodies, and more particularly to a stake design for the cargo bed of a truck or trailer.

2. Description of the Prior Art.

As set out in co-applicant's U.S. Pat. No. 3,871,702, issued Mar. 18, 1975 and incorporated by reference herein, a variety of stakes have been devised for flat bed trailer structures with a removable cargo box and having a tarpaulin roof supported above the cargo box by the stakes.

A typical stake is secured to the vehicle at its lower end and supports one end of one of the bows provided for the tarpaulin roof from its upper end. One method of supporting a bow end with a stake has been to entrain the end of the bow in a bow receiving socket provided within the upper end of the stake. However, such a design provides that the top of the stake be of an open-end construction which exposes the inside of the stake to rain and the corrosive elements characteristic of the highway environment. During cold weather, this can result in a substantial accumulation of sand, ice, and corrosive salts within the stake when the vehicle is used.

In the open-end construction of the prior art stakes where the tarpaulin stake pocket only occupies a portion of the total cross-sectional area of the top of the post, a bow end could be improperly placed between the inside wall of the stake and the bow socket instead of in the socket itself. This can result in distortion or rupture of the stake wall. Additionally, the outer edge of the exposed open top of the stake can cut or tear the tarpaulin canvas which is stretched over the stake when the tarpaulin roof is assemblied and the vehicle put into service.

The present invention solves these problems by providing a unique cap for the stake structure which overcomes these difficulties.

SUMMARY OF THE INVENTION

This invention relates to a cap for the stake of a flat bed trailer structure with a removable cargo box and having a tarpaulin roof supported above the cargo box by the stakes. The structure of the cap encloses the top of the stake and includes a fastening means extending downwardly and couplable with the inner portions of the hollow stake which cooperates with the stake to form a tarpaulin bow end receiving socket for supporting the bow.

It is therefore an object of the invention to provide a protector cap for a hollow stake which encloses the top of the stake and cooperates with the stake to form a tarpaulin bow end receiving socket.

It is another object to provide a cap of the foregoing character which reduces the deleterious accumulations of water and corrosive material within a hollow stake.

It is another object to provide a cap of the foregoing character which prevents tearing of the tarpaulin of the tarpaulin roof provided for the vehicle.

It is another object to provide a cap of the foregoing character which insures proper emplacement of the end of a tarpaulin bow in the tarpaulin bow and receiving socket.

It is another object to provide a cap of the foregoing character providing for a reinforced tarpaulin bow end receiving socket for supporting the bow.

These and other objects will become apparent from reference to the following description, attached drawings and appended claims.

BRIEF DESCRIPTION OF THE DRAWINGS

FIG. 1 is a perspective view of a trailer employing the stake and cap arrangement with vertical wall construction and tarpaulin bows;

FIG. 2 is an exploded perspective view illustrating the construction in part of the tarpaulin rod, the tarpaulin bow end receiving socket, and the stake and cap arrangement;

DESCRIPTION OF THE PREFERRED EMBODIMENT

Figure 3:
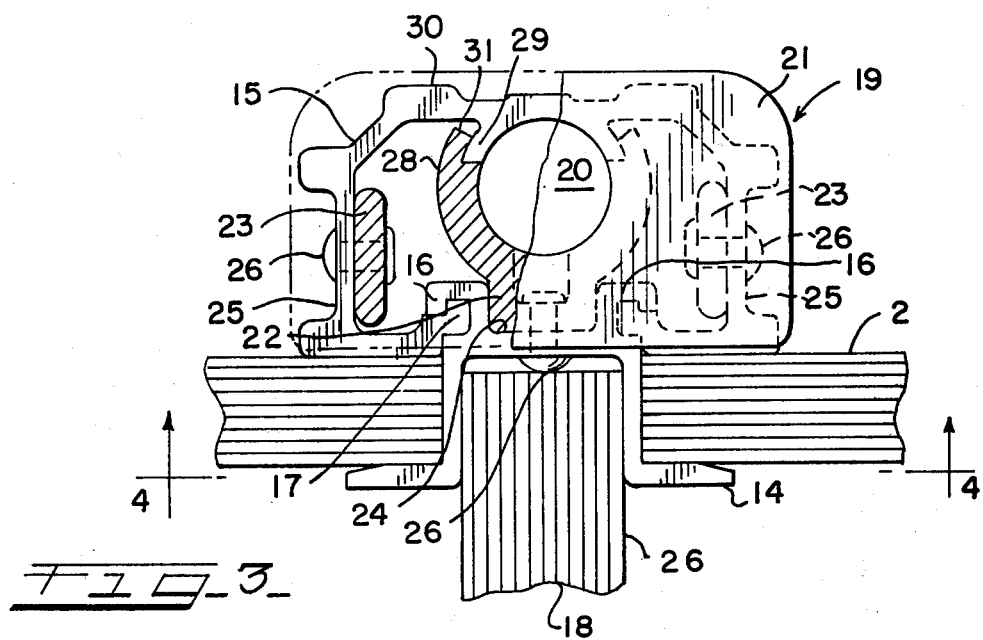
FIG. 3 is a plan view partially in section taken along line 3—3 of FIG. 1.

Referring now to the drawings and in particular with reference to FIG. 1, there shown is a flat bed trailer 1 that has a plurality of side wall sections or panels 2 held up or entrained by a plurality of hollow stakes or rack body stakes or posts 3 which are held in stake pockets 4 which are welded onto the side beam member 5. The front 6 of the trailer 1 is a single wall member 7 having on its outside upright reinforcing beams 8. The trailer 1 is further provided with the usual bogies 9 and landing gears 10. The rear of the trailer is provided with a transversely extending end bulkhead (not shown in the drawings) which is held up by the rearmost stakes 3 entraining the rearmost sidewall section 2. Longitudinally extending skid rails 11 are mounted lengthwise horizontally on the stake pockets 4 on the sides, rear and front of the trailer 1. The top of the trailer is provided with tarpaulin bows 12. A tarpaulin (not shown in the drawings) is secured on the bows 12 which have their ends 13 extending into the tops of the stakes 3 as illustrated in FIG. 2.

Figure 4:
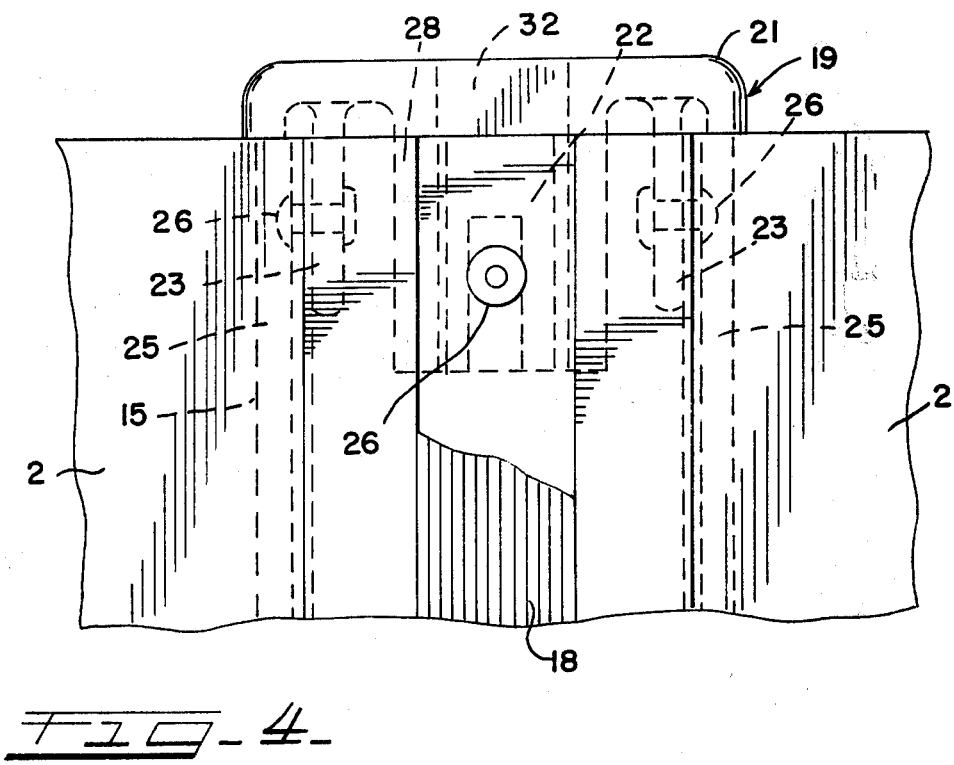
FIG. 4 is a cross-sectional view partially in section taken along line 4—4 of FIG. 3.

The construction of the stake 3 is seen in FIGS. 2–4 which show it as comprising an inner or inboard stake member 14 and outer or outboard member 15, each of the stake members dovetailing together with respect to one another through longitudinal wall portions or dovetailing sections 16 and 17 whereby each stake member is vertically slidable with respect to the other for assembly of the stake 3. The stake structure further includes a means of securing wall panels 2 and transverse bulkhead 18 as disclosed in coapplicant's U.S. Pat. No. 3,871,702, issued Mar. 18, 1975.

The invention provides a cap 19 secured to the inner and outer members 14 and 15. The cap 19 cooperatively forms with the outer member 15 a tarpaulin bow receiving socket or pocket 20 which carries the end 13 of the tarpaulin bow 12. The structure of the cap 19 includes a plate-like aperture upper portion 21 carried on the upper ends of the stake members 14 and 15, a downwardly extending inner cap flange or inboard fastening means 22, and a pair of longitudinally spaced downwardly extending outer cap flanges or outboard fastening portions 23. The inner cap flange 22 is slidably received by the outer center portion or vertically extending groove 24 of the inner stake 14, and the outer cap flanges 23 are each slidably received by the longitudinally spaced transverse side walls or sides 25 of the outer stake 15, each outer flange 23 being adjacent one of the sides 25. Further, to prevent vertical sliding movement between the stake members, the inner and outer cap flanges 22 and 23 are secured to the inner and outer stake members 14 and 15 by rivets 26, respectively, as illustrated in FIGS. 3 and 4.

The bow receiving socket 20 is cooperatively defined by an arcuate inner or inboard bow socket portion 28 provided for on the inner cap flange or fastening means 22 and a vertically extending arcuate outer or outboard bow socket portion 29 provided for on the inner portion of the outer longitudinally extending side 30 of the outer stake member 15. The outer bow socket portion 29 is vertically slidably engaged by the outer ends 31 of the inner bow socket portion 28 in an entrapping dovetail fashion. Thus it can be seen that to secure the tarpaulin bow in the stake structure, the end 13 of the bow is extended through the aperture 32 in the upper portion 21 of the cap 19 and engaged by the dovetailingly coupled arcuate bow socket portions 28 and 29 to support the bow 12 on the stake 3.

In the view of this structure, it should be particularly noted that by providing for a portion of the cap 19 to cooperate with the stake 3 to form the bow receiving pocket 20, the present invention minimizes the quantity or amount of material necessary to manufacture the stake. Additionally, the dovetailing interface between the arcuate sections 28 and 29 defining the bow receiving bore or pocket 20 provides a continuous pocket to entrain the bow end 13, thereby substantially improving the structural integrity of the receiving pocket and its resistance to static and fatigue loading resulting from the weight, wind loads and vibration of the tarpaulin roof structure impressed through the bow during the use of the vehicle.

The invention further insures the structural integrity of the stake 3 by providing that the platelike upper portion 21 of the cap 19 enclose the open top of the stake 3. This feature prevents destructive distortion of the tarpaulin bow receiving pocket 20 resulting from lateral impacts on the stake 3 when it is dropped or bumped as well as providing a smooth surface over which the canvas tarpaulin of the tarpaulin roof may be stretched. This eliminates the possibility of the canvas being cut or torn by the relatively sharp edges of the top of the stake. Additionally, because the cap 19 substantially seals the top of the stake 3, it prevents the development of deleterious accumulations of water and corrosive material within the hollow post. Similarly, since the upper portion 21 of the cap encloses the end of the stake post except for the aperture or bore 32 which provides access to the tarpaulin bow receiving pocket 20, proper emplacement and alignment of the bow end 13 in the receiving pocket is assured. This feature thereby eliminates the possibility of a bow being improperly placed in the stake and rupturing the side walls of the stake.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. For a highway vehicle having a removable cargo container including a tarpaulin roof supported thereabove by tarpaulin bows,
   a vertical extending hollow stake adapted to carry a tarpaulin bow and having both a vertically extending stake bow portion and a vertically extending groove formed in its interior, and
   a protector cup extendable over said stake and having a fastening portion extending downward therefrom and couplable with the groove on the interior of said hollow stake,
   said cap having a cap bow socket portion depending therefrom so as to be vertically slidably coupled and coopertive with the stake bow socket portion to define a continuous bow receiving socket for receiving a bow extending through said protector cap and into the hollow stake, said stake bow socket portion having outer edge portions and said cap bow socket portion having outer edge portions interlocking in anti-rotational fashion with the outer edge portions of the stake bow socket portion consequent upon vertical sliding coupling of the cap bow socket portion with respect to the stake bow socket portion.

2. The invention according to claim 1, and said cup having a plate-like upper portion with a bow receiving bore defined therein above said cap bow socket portion and in communication therewith for receiving the bow through the cap bore and into the bow receiving socket.

3. The invention according to claim 1, and
   said hollow stake including an inboard stake member having a longitudinally extending inboard wall portion, and
   an outboard stake member including a longitudinally extending outboard wall portion spaced from said inboard wall portion, a pair of transverse side walls, and a pair of spaced longitudinal wall portions extending from the transverse side walls and couplable with said inboard wall portion.

4. For a highway vehicle having a removable cargo container including tarpaulin roof supporting bows;
   a vertically extending hollow stake including longitudinally spaced transverse wall portions, inboard and outboard longitudinal wall portions extending between said transverse wall portions and a vertically extending stake bow socket portion formed on the interior of the outboard longitudinal wall intermediate said transverse wall portions, and
   a replaceable stake protector cap adapted to overlie the stake and including a cap bow socket portion depending from the protector cap into the stake between said stake bow socket portion and said inboard longitudinal wall portion for vertical sliding coupling with said stake bow socket portion to define a vertically extending bow socket for receiving and supportably coupling a tarpaulin bow portion extendable through the protector cap, said stake bow socket portion having outer edge portions, and said cap bow socket portion having outer edge portions interlocking in anti-rotational fashion with the outer edge portions of the stake bow socket portion consequent upon vertical sliding coupling of the cap bow socket portion with respect to the stake bow socket portion preventing destructive rotational oscillation between the bow, protector cap and the stake.

5. The invention in accordance with claim 4, and
   said stake comprising inboard and outboard sections with vertically slidably couplable means provided on each section for interlocking said sections, and means fixedly interconnecting said cap bow socket portion with said inboard section to further interlock said inboard section to said outboard section through said stake bow socket portion.

6. The invention in accordance with claim 5, and said protector cap having a top web positioned in covering relation to the stake and a pair of lugs depending from said top web into said stake in abutting relation to the interior sides of the transverse wall portions thereof.

* * * * *